Patented Mar. 27, 1934

1,952,233

UNITED STATES PATENT OFFICE 1,952,233

PROCESS FOR THE MANUFACTURE OF CONVERSION PRODUCTS OF COLOPHONY AND A PRODUCT THEREOF

Josef Binapfl, Crefeld, Germany, assignor to I. G. Farbenindustrie Aktiengesellschaft, Frankfort-on-the-Main, Germany No Drawing. Application July 29, 1931, Serial No 553,893. In Germany July 31, 1930

9 Claims. (Cl. 202—3)

The present invention relates to the manufacture of conversion products of colophony by heating it in the presence of appropriate activating agents.

It is already known that colophony is decomposed by prolonged heating to 350–390° C. In such a decomposition process high-boiling, viscous, partially dark-colored products are obtained besides gaseous reaction products, acetic acid and more readily volatile oils. The said high-boiling viscous porducts yield after the removal of their acid components and after distillation the so-called resin oils.

In accordance with the present invention decomposition of colophony can be effected more readily at a lower temperature, when the colophony is heated in the presence of a hydrosilicate of large surface such as Florida earth, fuller's earth, etc., and the said hydrosilicate of large surface is activated by the addition of a hydrohalic acid such as hydrochloric acids, hydrobromic acid, etc. When proceeding in this manner, gases (carbon dioxide, carbon monoxide) are evolved and water is formed on heating the mixture at a temperature of 180–300° C. Instead of the simultaneous use of a hydrosilicate of large surface and an activating hydrohalic acid, hydrosilicates of large surface which prior to their application have been activated by means of hydrohalic acids may be used for decomposing colophony at a temperature of 180–300° C. and in a shorter time than in the well known process characterized above. A hydrosilicate of the kind contemplated is available in commerce under the trade name "Tonsil" (compare O. Kausch "Das Kieselsaeuregel und die Bleicherden", Berlin 1927, page 187, last paragraph). "Tonsil" is prepared by activating with aqueous hydrochloric acid a naturally occurring bleaching-earth of large surface, essentially consisting of aluminum hydrosilicate. A mixture of colophony and "Tonsil" is decomposed at 180–250° C. When a mixture of colophony and "Tonsil" is heated to melting and hydrochloric acid is passed in while further heating, the evolution of gas commences at 155° C.

By suitably adjusting the temperature and duration of the reaction, it is possible to obtain either neutral, light coloured oils substantially free from oxygen, or products still having an acid character but a lower acid value and modified properties as compared with the starting material.

The following examples serve to further illustrate the invention which is not restricted to the details described therein.

Example 1

500 parts by weight of colophony (acid value 171) are heated in the course of one hour to 180–200° C. in a suitable stirring vessel in the presence of 25 parts by weight of a bleaching earth such as is known in commerce under the trade name "Tonsil". A fairly strong evolution of gaseous reaction products soon takes place, which is complete after heating during about one hour at 215–220° C. Heating is then continued for about 20 minutes to 240–250° C. and a strongly fluorescent reaction mass is obtained, which is liquid even at room temperature.

After the "Tonsil" has been removed by filtration, the product is distilled in vacuo. The distillate is a clear, yellowish oil which boils between 70 and 390° C. After repeated distillation under diminished pressure the main fraction boils from 90–220° C. under a pressure of 2 mms. mercury gauge. This fraction has an acid value of 0.11 and the saponification number 0.3. According to analysis it contains 89.3% of carbon and 10.6% of hydrogen.

A small quantity of a pitch like resin (acid value 5) remains as residue.

The acid value and the saponification number of the products obtained in the process described above vary according to the conditions under which this process is performed. Generally an oil is obtained which has an acid value smaller than 1 and a saponification number smaller than 2, and an iodine number of from 24 to 26, this oil consisting substantially of hydrocarbons.

Example 2

When the reaction mixture of Example 1 is heated only for about 10–15 minutes to 202–215° C., evolution of gaseous products occurs only to a small extent. After removal of the "Tonsil" a clear mass is obtained, which is distinguished from the starting material by its viscous consistence, a lower acid value and by the absence of the Storch-Morawski reaction.

Example 3

When in Example 1 "Tonsil" is used, which prior to being added to the colophony has been treated with gaseous hydrochloric acid, until an increase of weight of 9–10% calculated on the weight of the "Tonsil" used has been established, the decomposition of colophony begins already at 155–160° C.

Example 4

When the reaction mixture of Example 1 is heated to melting and gaseous hydrochloric acid is passed in while further heating, the evolution of gas commences already at 155° C. The passing in of a uniform current of hydrochloric acid is continued and the reaction is complete after about 1½ hours. A product of the same character as described in Example 1 is obtained.

*Example 5*

A mixture of 500 parts by weight of molten colophony (acid value 165) and 28 parts by weight of fuller's earth is gradually heated, while stirring, to 200–280° C. in a suitable apparatus and gaseous hydrochloric acid is passed in. Gaseous reaction products evolve and after about 4 hours a liquid reaction mixture of an acid value of 2 is obtained.

I claim:

1. Process for the manufacture of conversion products of colophony which comprises heating to a temperature of about 155° C. to about 300° C. the colophony in the presence of an aluminium hydrosilicate of large surface activated with a hydrohalic acid.

2. Process for the manufacture of conversion products of colophony which comprises heating to a temperature of about 155° C. to about 300° C. the colophony in the presence of an aluminium hydrosilicate of large surface activated with hydrochloric acid.

3. Process for the manufacture of conversion products of colophony which comprises passing hydrohalic acid into a mixture of colophony and an aluminium hydrosilicate of large surface at a temperature of about 155° C. to about 300° C.

4. Process for the manufacture of conversion products of colophony which comprises passing hydrochloric acid into a mixture of colophony and an aluminium hydrosilicate of large surface at a temperature of about 155° C. to about 300° C.

5. Process for the manufacture of conversion products of colophony which comprises heating to a temperature of about 180° C. to about 250° C. the colophony in the presence of an aluminium hydrosilicate of large surface, obtainable by activating with aqueous hydrochloric acid a naturally occurring bleaching earth of large surface essentially consisting of aluminium hydrosilicate.

6. Process for the manufacture of conversion products of colophony which comprises heating to a temperature of at least 155° C. to 160° C. a mixture of colophony and an aluminium hydrosilicate of large surface, obtainable by activating with aqueous hydrochloric acid a naturally occurring bleaching earth of large surface essentially consisting of aluminium hydrosilicate, and which prior to being added to the colophony has been treated with gaseous hydrochloric acid.

7. Process for the manufacture of conversion products of colophony which comprises passing hydrochloric acid into a mixture of colophony and an aluminium hydrosilicate of large surface, obtainable by activating with aqueous hydrochloric acid a naturally occurring bleaching earth of large surface essentially consisting of aluminium hydrosilicate, said mixture being heated to a temperature of at least 155° C.

8. An oil substantially consisting of hydrocarbons and having a boiling range from about 90° C. to about 220° C. under a pressure of 2 mm. mercury gauge, having an acid value smaller than 1, and an iodine number of from 24 to 26, said oil being obtainable by heating colophony to a temperature of about 155° C. to about 300° C., in the presence of an aluminium hydrosilicate of large surface activated with a hydrohalic acid, and repeated fractional distillation of the material thus obtainable.

9. An oil substantially consisting of hydrocarbons and having a boiling range from about 90° C. to about 220° C. under a pressure of 2 mm. mercury gauge, and an acid value smaller than 1, a saponification number smaller than 2, and an iodine number of from 24 to 26, said oil being obtainable by heating colophony to a temperature of about 155° C. to about 300° C., in the presence of an aluminium hydrosilicate of large surface activated with hydrochloric acid, and repeated fractional distillation of the material thus obtainable.

JOSEF BINAPFL.